US012166792B2

United States Patent
Liu et al.

(10) Patent No.: US 12,166,792 B2
(45) Date of Patent: Dec. 10, 2024

(54) INLINE IDENTIFY AND BLOCK DANGLING DNS RECORDS

(71) Applicant: Palo Alto Networks, Inc., Santa Clara, CA (US)

(72) Inventors: Daiping Liu, Sunnyvale, CA (US); Ruian Duan, Santa Clara, CA (US); Jun Wang, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 365 days.

(21) Appl. No.: 17/511,393

(22) Filed: Oct. 26, 2021

(65) Prior Publication Data
US 2023/0130115 A1  Apr. 27, 2023

(51) Int. Cl.
*H04L 9/40* (2022.01)
*H04L 61/4511* (2022.01)

(52) U.S. Cl.
CPC ...... *H04L 63/1466* (2013.01); *H04L 61/4511* (2022.05); *H04L 63/0236* (2013.01); *H04L 63/20* (2013.01)

(58) Field of Classification Search
CPC ............. H04L 63/1466; H04L 61/4511; H04L 63/0236; H04L 63/20; H04L 9/40
See application file for complete search history.

(56) References Cited

U.S. PATENT DOCUMENTS

| 11,196,635 | B1 * | 12/2021 | Gelernter | H04L 41/12 |
| 2005/0203875 | A1 * | 9/2005 | Mohammed | H04L 43/0817 |
| 2012/0265748 | A1 * | 10/2012 | Simpson | H04L 61/302 |
| | | | | 707/E17.108 |
| 2016/0191243 | A1 * | 6/2016 | Manning | H04L 63/18 |
| | | | | 713/168 |
| 2017/0195285 | A1 * | 7/2017 | Kakhki | H04L 61/3025 |
| 2022/0321596 | A1 * | 10/2022 | Weizman | H04L 63/1483 |

FOREIGN PATENT DOCUMENTS

WO  WO-2023040070 A1 * 3/2023

OTHER PUBLICATIONS

Alowaisheq et al. Zombie Awakening: Stealthy Hijacking of Active Domains through DNS Hosting Referral, ACM CCS'2020. Oct. 2020.
Borgolte et al. Cloud Strife: Mitigating the Security Risks of Domain-Validated Certificates, NDSS'2018. Feb. 2018.
Liu et al. All Your DNS Records Point to US Understanding the Security Threats of Dangling DNS Records. CCS'16. Oct. 2016.
Microsoft Docs. Prevent subdomain takeovers with Azure DNS alias records and Azure App Service's custom domain verification. Feb. 4, 2021.
Rashid et al. Understanding the Security Threats of Esoteric Subdomain Takeover and Prevention Scheme, ECCE'2019. Apr. 2019.
Squarcina et al. Can I Take Your Subdomain? Exploring Same-Site Attacks in the Modern Web, USENIX Security'2021. Aug. 2021.

* cited by examiner

*Primary Examiner* — Jayesh M Jhaveri
(74) *Attorney, Agent, or Firm* — Van Pelt, Yi & James LLP

(57) ABSTRACT

The present application discloses a method, system, and computer system for identifying dangling records. The method includes obtaining a set of domains, determining whether a record associated with a domain comprised in the set of domains is dangling, and in response to determining that the record associated with the domain is dangling, providing, to a registrant, a notification that the record is dangling.

19 Claims, 6 Drawing Sheets

INLINE IDENTIFY AND BLOCK DANGLING DNS RECORDS

BACKGROUND OF THE INVENTION

Nefarious individuals attempt to compromise computer systems in a variety of ways. As one example, such individuals may seek to register domains or subdomains that were previously registered (e.g., to a genuine individual or service) and that for some reason has become available such as in the case that a registrant erroneously allowed such registration to lapse. Upon successful registration of a domain or subdomain, nefarious individuals may seek host malicious services on such domains or subdomains, such as causing malware to infect client terminals attempting the access the services previously provided by the genuine individual or service. Accordingly, there exists an ongoing need for improved techniques to identify resources exposed to the hijacking of resources by nefarious individuals.

BRIEF DESCRIPTION OF THE DRAWINGS

Various embodiments of the invention are disclosed in the following detailed description and the accompanying drawings.

DETAILED DESCRIPTION

Figure 1:
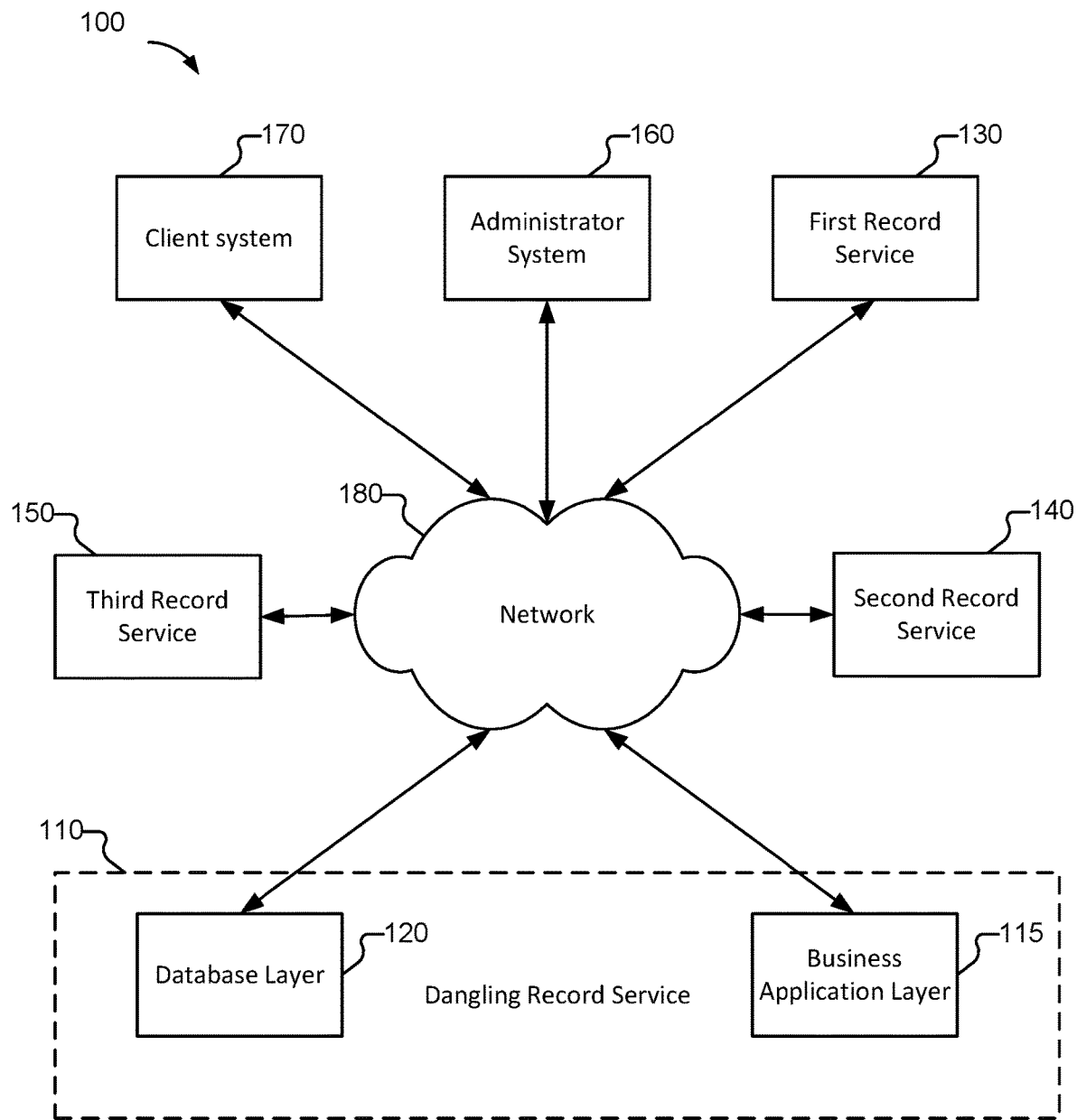
FIG. 1 is a block diagram of a system to provide a dangling record detection according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining whether a record corresponds to a dangling record is disclosed. The system comprises one or more processors and a memory. The one or more processors are configured to obtain a set of domains, determine whether a record associated with a domain comprised in the set of domains is dangling, and in response to determining that the record associated with the domain is dangling, provide, to a registrant, a notification that the record is dangling.

As used herein, the term "dangling" refers to a state in which a record was previously registered and a current registration of the record is not complete or is otherwise invalid and that registration of the record is potentially susceptible to a third party registration.

As used herein, the term "record" refers to an internet resource that is registerable or allocable to a party. Examples of a record include a domain, a subdomain, an IP address, an account with a third party service, a mail exchange (MX) record, a nameserver (NS) record, a canonical name (CNAME) record, a delegation name (DNAME) record, etc.

Nefarious individuals may monitor for dangling records or seek to register a record in order to spoof third parties attempting to obtain a service or information from the record. For example, a malicious party may attempt to register a domain that it knows to be expired and that it knows provided a genuine service to third parties before lapsing of the registration for the record. Accordingly, ingress and outgress communications with respect to the record such as a domain would be subject to being exposed to malicious parties. If a malicious party is successful in registering a lapsed record, the malicious party can send out emails or other communications to third parties that are unaware of the change in registration of the record. Similarly, if a malicious party is successful in registering a lapsed record, the malicious party may set redirects such that a third party attempting to access the record such as a domain is redirected to the malicious party or attacker that now owns, or otherwise has registration with respect to, the record. In the case of domain, if a malicious party successfully registers the domain, the malicious party may hijack the authoritative DNS. In view of the above, there is a need for active detection of dangling records to alert registrants of dangling records for which registration(s) may have been erroneously lapsed.

According to various embodiments, the system determines whether a record corresponds to a dangling record based at least in part on a determination that the record is available for registration or allocation. In some embodiments, the system determines whether the record is dangling contemporaneous with DNS traffic. For example, in response to receiving a DNS query, the system determines a record corresponding to the DNS query (e.g., a domain, a subdomain, an IP address, etc.), and the system determines whether the record is dangling contemporaneous with servicing the DNS query. In some embodiments, the system intercepts a DNS query or intercepts a response to the DNS query, and the system determines whether the record is dangling (e.g., before a response is communicated to the client form which the DNS query originated). In some embodiments, the system determines whether a record is dangling according to a predetermined schedule. For example, the system receives (or manages) a set of records such as records associated with one or more customers, and at predefined time intervals the system iterates through the set of records to determine whether a record is dangling. The predefined time interval may be set to be daily, weekly, monthly, etc. Various other time intervals or schedules can be set based on a configuration or request of a user such as an administrator. With respect to top-level domains, a grace period is usually extended to registrants to recover domains before lapsed domains become available to the public. The grace period is typically 2 months. Accordingly, in some embodiments, the system performs a check across a set of domains every three months (or another time period greater than 2 months to allow for lapsed registrations to be publicly exposed). A suspicious party take registration of the record between a time that registration of a record (e.g., the domain) lapses and the system performs a check to determine whether the record is dangling. Accordingly, in various embodiments, the system optimizes or reduces the amount of time between expiry or lapsing of a record and the checking of the record. In some embodiments, the system stores expected expiration dates corresponding to one or more records, and the system queries a third party service providing registration a predetermined period after the expected registration date for a particular record. In some embodiments, the set of domains can correspond to one or more domains associated with a user or a customer (e.g., a customer of the service provided by the system). In some embodiments, the set of domains corresponds to a plurality of domains across a set of users or customers.

According to various embodiments, in response to determining that a record corresponds to a dangling record, the system provides an indication that the record is dangling (also referred to herein as a dangling record). In some embodiments, the system determines contact information pertaining to the registrant associated with the record and communicates to an address or contact comprised it the contact information an indication that the record is dangling. The indication that the record is dangling can include a notice that the record is dangling and an indication that the record could be subject to malicious attackers (e.g., that the record could be registered by a third party). The address comprised in the contact information can comprise an email, a telephone number, an account identifier (e.g., for an account associated with the system for a service of checking whether records for the account are dangling, etc.). In some embodiments, the system determines the contact information pertaining to the registrant associated with the record based at least in part on querying a service to which the record pertains. For example, in the case that the record is a domain, the system queries the WHOIS record for the domain and obtains the registration information from the WHOIS record. In some embodiments, in response to determining that a record is a dangling record, the system communicates to the registrar associated with the record (e.g., the service that provides the registrant with service with respect to the record) and provides an indication to such registrar that the record could be subject to a malicious attacker.

In some embodiments, in response to determining that the record is dangling, the system causes the traffic to the record to be blocked. For example, in the case that the dangling record is a domain, the system actively blocks DNS traffic to the domain or provides an indication or instruction to another network device to block the DNS traffic to the domain. As another example, in the case that the determination that the record is dangling is performed contemporaneous with DNS traffic directed to the record, the system blocks the DNS traffic to the record or return a sinkhole address/redirect to the client from which such DNS traffic originated. As another example, in response to determining that the record is dangling, the system updates a firewall policy such as in order to cause traffic directed to the record to be blocked (or redirected to a different address associated with the previous registrant associated with the record). In some embodiments, the system stores a whitelist of records (e.g., domains) for which traffic is not blocked or redirected. For example, even if a record is determined to be a dangling record, the system permits traffic with respect to the record (e.g., the system does not block or redirect traffic for a record on the whitelist). The whitelist can be configurable such as by an administrator, a customer, etc.

According to various embodiments, the system that detects dangling records or determines whether a record is a dangling record is provided by one or more servers. For example, the system can be a cloud service that is provided to various users or customers. As another example, the one or more servers receive queries from passive DNS services, a DNS security server, a DNS resolver, etc.

The system improves the security of records (e.g., registrations of records) and reduces the likelihood that records are hijacked by malicious third parties. Related art systems may identify dangling records within its own system such as for registrations that such related systems manage. Such related art systems generally require access to the account for the registration. For example, a domain registrar can identify for its customers those domain registrations or subdomain registrations of a customer that have lapsed. Various embodiments are not restricted to detecting dangling records within records (e.g., domains) managed by the system. For example, various embodiments provide extensible detection of records across third party service providers and platforms. The system according to various embodiments does not require access to a registrant's account such as via credentials associated with the registrant in order to detect dangling records for such registrant. In some embodiments, the system uses information that is exposed to the public to determine whether a record is a dangling record. For example, the system queries third party services available to the public such as via application programming interfaces APIs developed for such third party services.

Third party service providers often throttle or cap the number of queries that a terminal (e.g., system) can send to the third service provider such as via an API. In some cases, third party service providers offer a premium service, usually a model requiring a paid subscription, in which the number of queries is uncapped or for which the cap is extended relative to the free service. According to various embodiments, the system registers a plurality of accounts on each of one or more third party services and uses the plurality of accounts to perform the queries the one or more third party services for dangling records with respect to a predetermined set of records (e.g., a set of records corresponding to a customer(s) of the system).

FIG. 1 is a block diagram of a system to provide a dangling record detection according to various embodiments of the present application. According to various embodiments, at least part of system 100 implements system 200 of FIG. 2. System 100 implements process 300 of FIG. 3, process 400 of FIG. 4, process 500 of FIG. 5, and/or process 600 of FIG. 6.

In the example shown, system 100 comprises a dangling record service 110. System 100 can further comprise one or more of first record service 130, second record service 140, third record service 150, administrator system 160, and/or client system 170. System 100 can further comprise network 180. According to various embodiments, dangling record service 110 comprises one or more of business application layer 115 and database layer 120.

First record service 130, second record service 140, and/or third record service 150 provide services to one or more users or customers. According to various embodiments, the services include registration of one or more records. As an example, first record service 130 is a domain registrar. As another example, second service 140 is a service provider that provides registration of subdomains (e.g., Shopify, Facebook, Google, Microsoft, etc.). Examples of the records include a domain such as a top-level domain or a subdomain, an IP address, an account, etc.

According to various embodiments, dangling record service 110 determines whether a record corresponds to a dangling record. As an example, dangling record service 110 obtains a set of domains, determines whether a record associated with a domain comprised in the set of domains is dangling, and in response to determining that the record associated with the domain is dangling, provides, to a registrant, a notification that the record is dangling. As another example, in addition to or as an alternative to providing the notification that the record is dangling, dangling record service 100 blocks or redirects traffic (e.g., DNS traffic) that is directed to the record.

As illustrated in FIG. 1, dangling record service 110 can comprise one or more of a business application layer 115 and/or a database layer 115.

The business application layer 115 is used in connection with controlling and/or configuring dangling record service 110. One or more policies can be set via business application layer 115 to monitor or detect dangling records. For example, an administrator uses administrator system 160 to communicate with business application layer 115 to configure (e.g., define) a set of domains or set of records for which dangling record service 110 is to monitor or detect dangling records. As another example, the administrator communicates with business application layer 115 to request or instruct dangling record service 110 to determine whether a record is dangling, or to set a schedule or time period according to which dangling record service 110 is to determine whether the record is dangling.

The database layer 120 or storage layer is configured to store mappings of users (or customers) to records such as records for which dangling service record 110 is to monitor or detect in connection with determining whether a record among such records becomes dangling. In some embodiments, the database layer 120 stores one or more policies according to which dangling record service 110 is to determine whether one or more records corresponds to a dangling record. The database layer 120 can further store a mapping of the one or more policies to one or more users or customers to which the respective policies pertain. The policies can include a policy indicating a schedule or time period according to which dangling record service 110 is to perform a determination of whether a record(s) corresponds to a dangling record.

According to various embodiments, dangling record service 110 determines whether one or more records associated with one or more record services (e.g., first record service 130, second record service 140, and/or third record service 150) is dangling. For example, dangling record service 110 queries the corresponding one or more record service in connection with determining whether the corresponding record(s) is dangling. In some embodiments, the queries include a query to register the record (e.g., if registration of the record is permitted or possible, dangling record service 110 can deems such record as dangling because it is available for a suspicious third party to register). In some embodiments, dangling record service 110 communicates the query to a record service via an API corresponding to the record service. For example, the business application layer 115 is used to make a call to the record service via the API. The queries to the one or more record services with respect to one or more records can be sent individually or in a batch. For example, dangling record service 110 communicates a plurality of queries to a particular record service for all or a subset of records for which dangling record service 110 is to monitor/detect dangling records.

System 100 further includes one or more networks such as network 18 over which administrator system 160 and/or client system 170 communicates with one or more of dangling record service 110 such as business application layer 115 and/or database layer 120. In various embodiments, network 125 includes one or more of a wired network, and/or a wireless network such as a cellular network, a wireless local area network (WLAN), or any other appropriate network. In some embodiments, business application layer 115 and/or database layer 120 are respectively implemented by one or more servers. System 100 may include various other systems or terminals.

Figure 2:
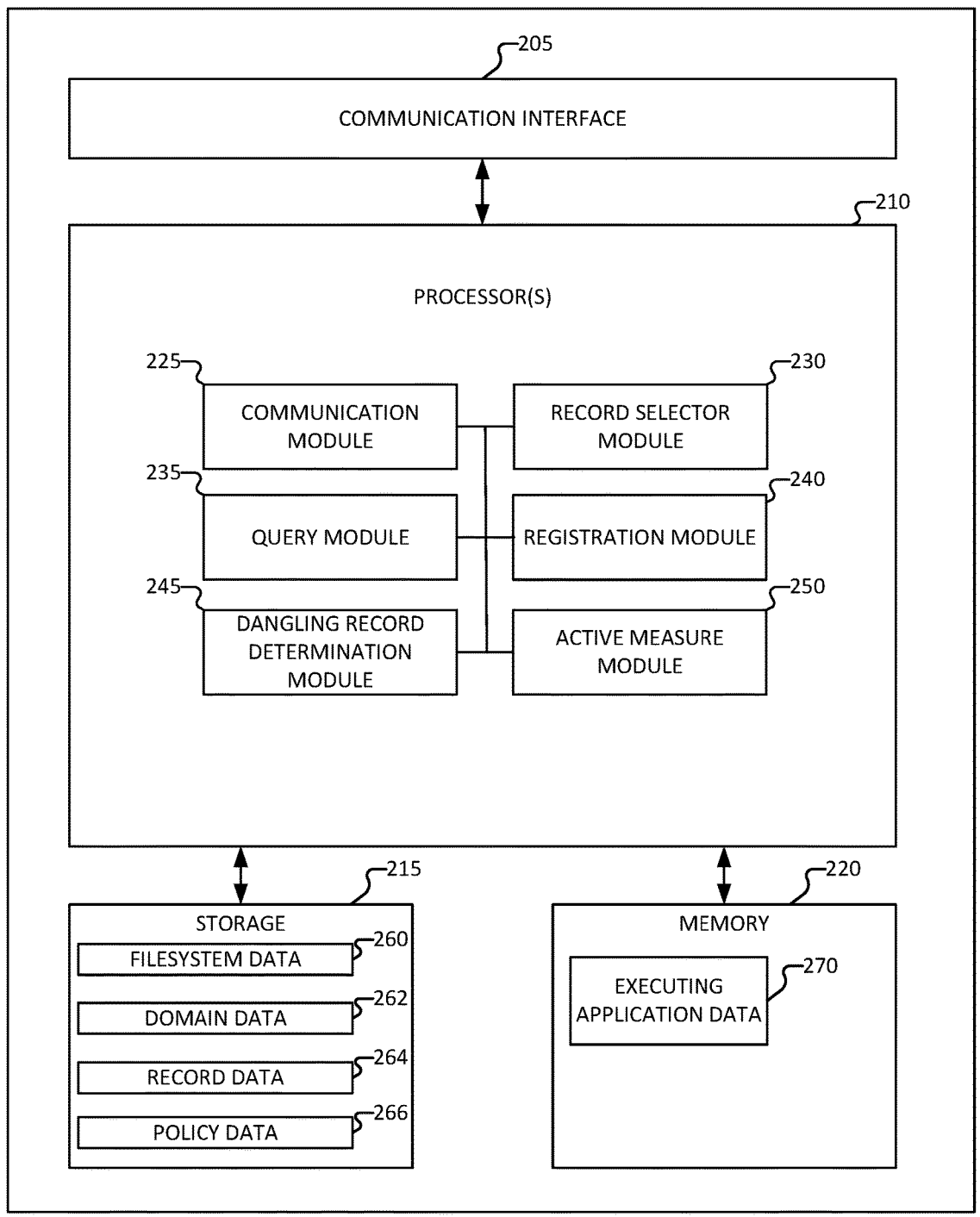
FIG. 2 is a block diagram of a system to provide dangling record detection according to various embodiments of the present application.

FIG. 2 is a block diagram of a system to provide dangling record detection according to various embodiments of the present application. According to various embodiments, system 200 is implemented in connection with system 100 of FIG. 1, such as for dangling record service 110. In various embodiments, system 200 is implemented in connection with process 300 of FIG. 3, process 400 of FIG. 4, process 500 of FIG. 5, and/or process 600 of FIG. 6.

System 200 can be implemented by one or more devices such as servers. System 200 can be implemented at various locations on a network. For example, the dangling record service is deployed on a DNS resolver. As another example, the dangling record service is deployed on a firewall. As another example, the dangling record service is a service that is provided to the DNS resolver (e.g., the dangling record service is deployed on one or more remote servers that services queries from the DNS resolver or firewall for a determination of whether a record such as a domain subject to DNS traffic corresponds to a dangling record). As another example, the dangling record service is deployed at a location on a network whereby dangling record service intercepts DNS traffic such as DNS queries and/or responses being communicated in response to DNS queries.

In the example shown, system 200 implements one or more modules in connection with determining whether a record is a dangling record. System 200 comprises communication interface 205, one or more processors 210, storage 215, and/or memory 220. One or more processors 210 comprises one or more of communication module 225, record selector module 230, query module 235, registration module 240, dangling record determination module 245, and/or active measure module 250.

In some embodiments, system 200 comprises communication module 225. System 200 uses communication module 225 to communicate with various client terminals or user systems such as an administrator system. In some embodiments, system 200 uses communication module 225 to communicate with one or more record services such as in connection with sending a query to determine whether a record is available with respect to a particular service (e.g., to determine if the record is registerable, to determine whether a registration of the record has lapsed/expired, to attempt to register the record, etc.), and/or receiving a response to the query. For example, communication module 225 provides to communication interface 205 information that is to be communicated. As another example, communication interface 205 provides to communication module 225 information received by system 200. Communication module 225 is configured to receive one or more DNS queries from various client terminals or systems such as firewalls, DNS resolvers, etc. For example, dangling record service is used to intercept DNS traffic and to identify dangling records before, or in connection with, providing responses to DNS traffic. Communication module 225 is configured to receive one or more settings or configurations from an administrator or user such as a customer to dangling record service 110. Examples of the one or more settings or configurations include configurations of a set of records with respect to which dangling records are to be monitored/detected, a policy with respect to which dangling records are to be monitored/detected (e.g., a schedule for determining whether a set of records comprise a dangling record, a time period or frequency according to which checks for dangling records are to be performed, a mapping of contact information to records, a white list of records such as domains for which traffic is to be permitted notwithstanding a determination that a corresponding record is dangling, etc.

According to various embodiments, system 200 comprises record selection module 230. System 200 uses record selection module 230 in connection with determining a record for which system 200 is determine whether the record is a dangling record (e.g., a record for which a query is to be sent to corresponding record service such as a domain registrar, etc.). In some embodiments, record selection module 230 determines the record based at least in part on DNS traffic. For example, in response to receiving a DNS query, system 200 is queried to determine whether the record corresponding to the DNS query (e.g., the top-level domain, the subdomain, the IP address, etc.) is a dangling record. In some embodiments, record selection module 230 based at least in part on a set of records such as a set of records for which system 200 is to monitor/detect a record becoming a dangling record, or a set of records corresponding to a particular user or customer. For example, if system 200 stores a policy for monitoring a set of records according to a predetermined schedule or frequency, and in response to a determination that such monitoring is to be performed at a current time based at least in part on the predetermined schedule or frequency, record selection module 230 determines the set of records corresponding to such policy.

In some embodiments, system 200 comprises query module 235. System 200 uses query module 235 to query one or more record services (e.g., first record service 130, second record service 140, and/or third record service 150). Query module 235 is used to query the one or more record services in connection with determining whether one or records are dangling. For example, query module 235 queries a record service to register a particular record (e.g., in connection with system 200 determining whether the particular record is registerable). As an example, in the case of the record being an IP address, query module 235 queries the public cloud to determine whether system 200 can obtain the IP address. As another example, in the case of the record being a domain, query module 235 queries a registrar or a service that provides TLD zonefiles. As another example, in the case of the record being a subdomain, query module 235 queries a third party service that provides the subdomain (e.g., Shopify, Google, Microsoft, Facebook, etc.).

In some embodiments, system 200 comprises registration module 240. System 200 uses registration module 240 to attempt to register a record with a record service and/or to manage registrations of records with the record service. For example, registration module 240 is configured to attempt to register an account or subdomain with a third party service (e.g., Shopify, Google, Microsoft, Facebook, Etsy, Pinterest, etc.). In some embodiments, a user configures a policy for system 200 to register a particular record associated with the user in response to determining that the record is dangling. For examples, according to such policy, in response to determining that registration of the record has expired/lapsed, system 200 uses registration module 240 to re-register the record for the user (e.g., the previous registrant that erroneously permitted registration for the record to expire/lapse).

In some embodiments, system 200 comprises dangling record determination module 245. System uses dangling record determination module 245 to determine whether a record is a dangling record. For example, dangling record determination module 245 determines whether the record is dangling based at least in part on a response query module 235 receives in connection with querying the one or more record services. If query module 235 receives an indication that a record has expired/lapsed, dangling record determination module 245 determines that the record is a dangling record. As another example, dangling record determination module 245 determines whether the record is dangling based at least in part on registration module 240 determining that the record is registerable such as with a third party service (e.g., registration module 240 is able to create an account or register a subdomain with a third party service such as Shopify, Microsoft, etc.).

In some embodiments, system 200 comprises active measure module 250. System 200 uses active measure 250 to perform one or more operations in response to system 200 determining that a record is a dangling record. The one or more operations performed in response to a determination that a record is a dangling record can be preset in one or more policies or preferences such a policy or preference of a customer on behalf of whom system 200 monitors the record. Examples of the one or more operations include provide an notice or indication that the record is a dangling record, registering the record, blocking traffic to a domain or address corresponding to a dangling record, redirecting traffic to a domain or address corresponding to a dangling record, etc. As an example, in response to system 200 determining that a record is a dangling record, active measure module 250 communicates (e.g., via communication module 225) an indication that the record is dangling. The indication is communicated to contact information pertaining to the record (e.g., a contact of a user or customer for which system 200 monitors the record, a registrant identified by a registrar associated with the record, etc.). As another example, in response to system 200 determining that a record is a dangling record, active measure module 250 registers the record such as on behalf of a user or customer (e.g., the previous registrant for such record).

According to various embodiments, storage 215 comprises one or more of filesystem data 260, domain data 262, record data 264, and/or policy data 266. Storage 215 comprises a shared storage (e.g., a network storage system) and/or database data, and/or user activity data.

In some embodiments, filesystem data 260 comprises a database such as one or more datasets (e.g., one or more datasets for one or more tenants, etc.). Filesystem data 260 comprises data pertaining to a customer, data used in connection with system 200 determining whether a record is a dangling record, historical information pertaining DNS queries, a white list of records such as domains (e.g., a set of domains for which traffic is to be permitted or otherwise not blocked in response to a determination that the domain is a dangling record), etc.

Domain data 262 comprises data pertaining to one or more domains. As an example, data pertaining to one or more domains comprises relationships and associations between domains (e.g., top-level domains, subdomains, etc.) and address information such as IP addresses. As an example, data pertaining to one or more domains comprises a mapping of domains to registrants such as users or customers of a service provided by system 200 to monitor/detect dangling records. As another example, domain data 262 comprises information pertaining to a domain comprised in a DNS query or response to a DNS query (e.g., a domain intercepted by system 200 from a DNS query or response to the DNS query).

Record data 264 comprises information pertaining to one or more records for which system 200 determines whether a particular record is a dangling record. In some embodiments, record data 264 comprises a mapping of records to record services that manage or provide registration for such record (e.g., a domain registrar, a public cloud, a third party service that permits users to register subdomains such as Shopify, etc.). As an example, record data 264 comprises a mapping of APIs or communication protocols or syntax according to which system 200 is to communicate with the record service(s). As another example, record data 264 comprises one or more indicators respectively indicating whether the one or more records correspond to dangling records.

Policy data 266 comprises one or more policies according to which system 200 is to determine whether one or more records correspond to a dangling record. For example, policy data 266 comprises a mapping of records to schedules or time periods according to which system 200 is to perform a check whether the record is a dangling record. As another example, policy data 266 comprises a mapping of records to active measures to be performed in response to determining that a particular record is determined to be a dangling record. As another example, policy data 266 comprises a mapping of users or customers to active measures to be performed in response to determining that a record of the user or customer is determined to be a dangling record. Various other policies may be stored in policy data 266.

According to various embodiments, memory 220 comprises executing application data 275. Executing application data 275 comprises data obtained or used in connection with executing an application such as an application executing a process for determining whether a record is a dangling record, or for configuring system 200 with respect to settings or policies to use in connection with determining whether a record is a dangling record. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an application for querying record services, an application for establishing a communication with a record service, an application for performing an active measure, an application for registering a record with a third party service, a report preparation application, a user interface application, a data analysis application, an application to block or redirect traffic, a user authentication application, etc.).

Figure 3:
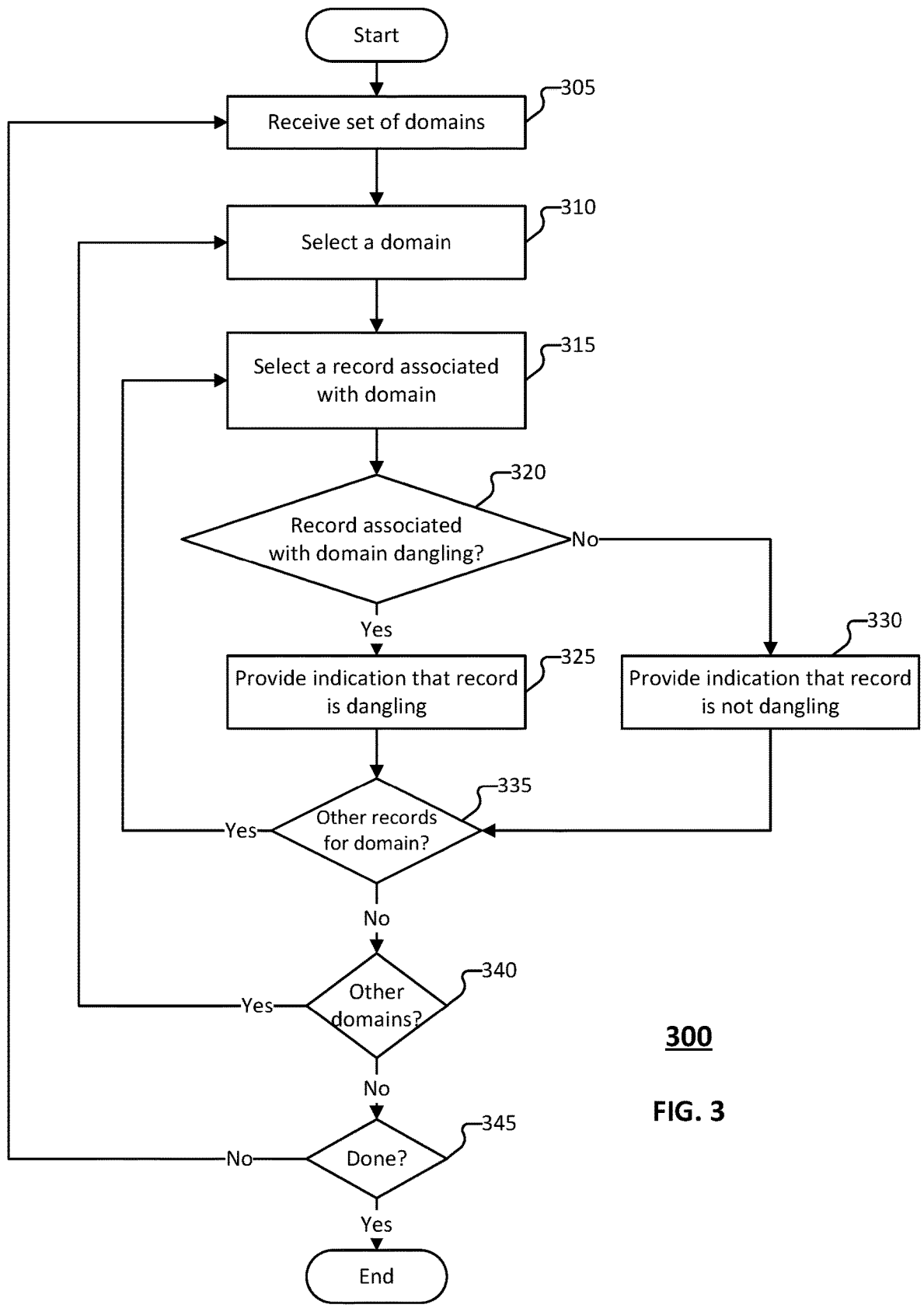
FIG. 3 is a flow diagram of a method for determining whether a record is dangling according to various embodiments of the present application.

FIG. 3 is a flow diagram of a method for determining whether a record is dangling according to various embodiments of the present application. According to various embodiments, process 300 is implemented in connection with system 100 of FIG. 1 and/or system 200 of FIG. 2.

In some embodiments, process 300 is invoked according to a predetermined schedule such as a schedule set by a customer of the dangling record service (e.g., a monitoring or detection service). Process 300 can be invoked in response to a user input such as a request from an administrator.

At 305, a set of domains is received. In some embodiments, the system receives the set of domains from a database of records for which system is configured to monitor or detect dangling records. For example, the set of domains can include the domains associated with a particular customer of the dangling record service. As another example, the set of domains corresponds to all domains for all customers for which dangling record service monitors or detects dangling records.

In some embodiments, the set of domains corresponds to one or more domains associated with a request from a DNS traffic intercept (e.g., a DNS resolver, a firewall, etc.). As an example, in response to intercepting one or more DNS queries or intercepting responses to one or more DNS queries, a set of domains is provided to the system to determine whether any of the one or more domains corresponds to a dangling record.

At 310, a domain is selected. The domain is selected from among the set of domains. In some embodiments, the domain is selected based on a determination that the domain corresponds to a customer of the system, or that such customer has subscribed to a level of service provided by the system.

At 315, a record associated with the selected domain is selected. In some embodiments, the system determines a record associated with the domain based at least in part on one or more records mapped to the domain (e.g., one or more records mapped to a user's account with respect to the domain). Examples of a record include a domain, a subdomain, an IP address, an account with a third party service, a mail exchange (MX) record, a nameserver (NS) record, a canonical name (CNAME) record, a delegation name (DNAME) record, etc. In some embodiments, the system selects the record in connection with iterating over all of, or a set of, records associated the domain.

At 320, a determination is made whether the record is a dangling record. In some embodiments, the system determines whether the record is dangling based at least in part on a determination that registration of the record has lapsed or expired, or that the record is otherwise registerable (e.g., that system is able to register the record).

According to various embodiments, the system queries one or more record services in connection with determining whether a record is dangling. The system determines a record service associated with the selected record, generates a query to such record service to determine information pertaining to the record (e.g., registration details pertaining to the record, availability of such record for registration, an indication of whether registration for the record has lapsed or expired, etc.). As an example, in the case of a domain, the system determines whether the domain is expired and registerable. The system determines whether top-level domain zonefiles comprise the domain. For example, if the top-level domain zonefiles comprise the domain, then the system deems the record (e.g., the domain) as not dangling. If the top-level domain zonefiles do not comprise the domain, the system queries a registrar (e.g., a domain registrar such as GoDaddy.com) to determine whether the domain can be registered (e.g., purchased). As an example, in response to determining that the domain can be registered, the domain is deemed a dangling record.

In response to determining that the record is a dangling record at 320, process 300 proceeds to 325 at which an indication that the record is dangling is provided. According to various embodiments, in response to determining that a record is a dangling record, the system provide a notice to the previous registrant. As an example, the system determines contact information pertaining to the record based at least in part on querying a record service (e.g., querying a WHOIS record in the case of the record being a top-level domain, such as a querying the WHOIS record for the corresponding registration information). As another example, in the case that system is monitoring the record on behalf of a customer, in response to determining that the record is dangling, the system provides the indication to the customer such as via a user interface (e.g., a dashboard provided by the system) and/or to contact information for such customer. In some embodiments, in addition or as an alternative to providing the indication, the system performs an active measure. Examples of the active measure include blocking traffic to the address associated with the dangling record, redirecting traffic to a sinkhole IP, etc.

Conversely, in response to a determination that the record is not a dangling record at 320, process 300 proceeds to 330 at which an indication that the record is not dangling. In some embodiments, 330 is excluded from process 300. For example, in some implementations, in response to determining that the record is not dangling, process 300 does not provide an indication of such and does not change traffic to the address corresponding to the record.

At 335, a determination is made as to whether to perform a check or determination for other records associated with the selected domain. In response to determining that the determination is to be made with respect to another record for the selected, process 300 returns to 315 and process 300 continues to perform 315-335 until no further records are to be checked to determine whether such records are dangling records. As an example, the determination of whether further records are to be monitored can be based at least in part on a set of records associated with a customer for such domain. As another example, the determination of whether further records are to be monitored can be based on a user input such as an instruction from an administrator to pause or quit process 300.

In response to determining that the determination is not to be made with respect to another record for the selected domain, process 300 proceeds to 340 at which a determination is made as to whether to perform a check or determination for another domain. In response to determining that the determination is to be made with respect to another domain, process 300 returns to 310 and process 300 continues to perform 310-340 until no further domains are to be monitored to determine whether associated records are dangling records. As an example, the determination of whether further domains are to be checked based on a determination that a set of DNS traffic for which process 300 was invoked does not comprise traffic for any further domains. As another example, the determination of whether further domains are to be checked based on a determination that a set of domains for which the system is to monitor according to a predetermined schedule for which process 300 was invoked does not comprise any further domains. As another example, the determination of whether further domains are to be monitored can be based on a user input such as an instruction from an administrator to pause or quit process 300.

At 345, a determination is made as to whether process 300 is complete. In some embodiments, process 300 is determined to be complete in response to a determination that no further domains exist among the set of domains (e.g., for at least this iteration of process 300), an administrator indicates that process 300 is to be paused or stopped, etc. In response to a determination that process 300 is complete, process 300 ends. In response to a determination that process 300 is not complete, process 300 returns to 305. In some embodiments, process 300 is invoked at a next scheduled time or after a predetermined time, or in response to an event (e.g., in response to receipt of suspicious DNS traffic, etc.).

Figure 4:
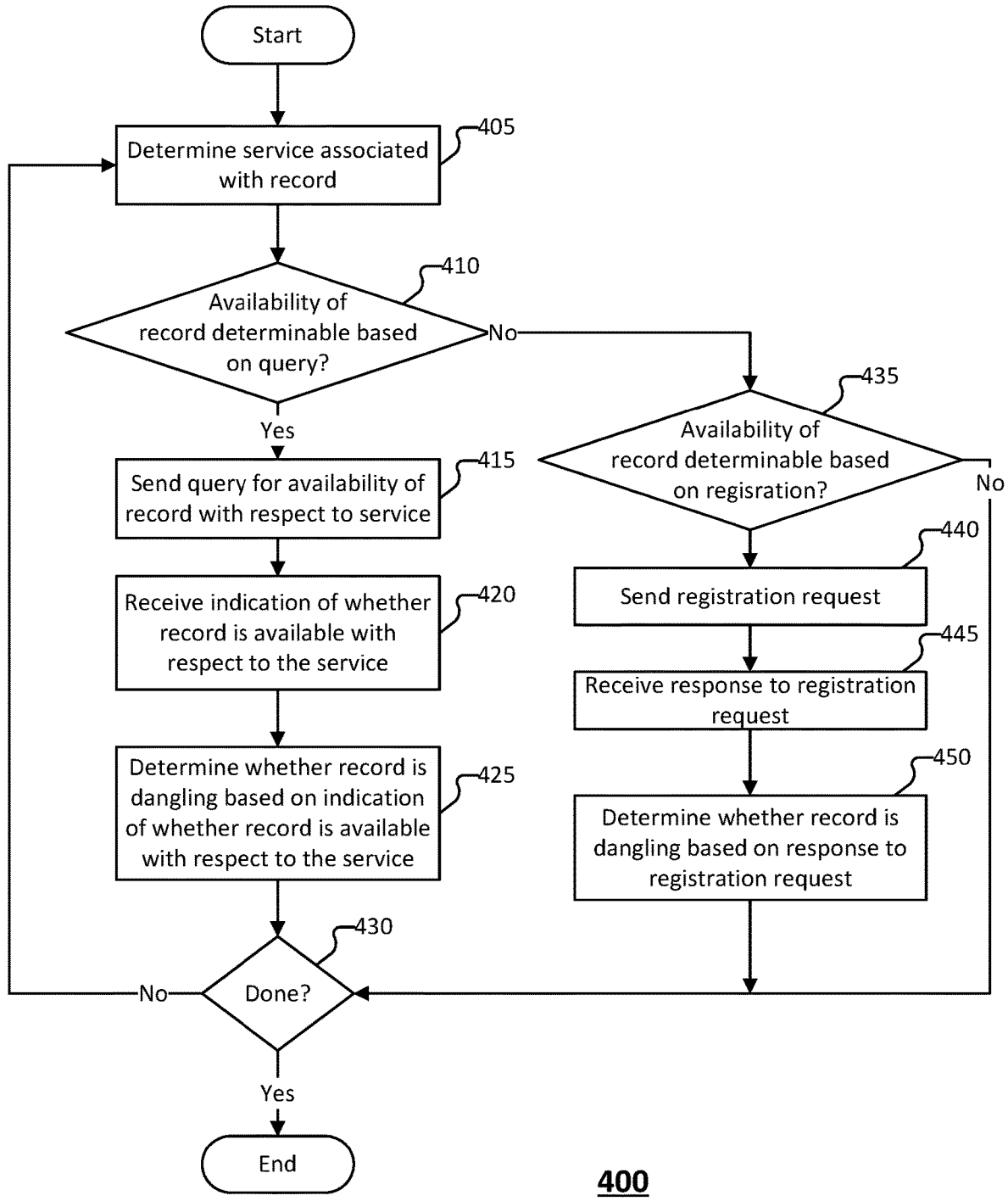
FIG. 4 is a flow diagram of a method for determining whether a record is dangling according to various embodiments of the present application.

FIG. 4 is a flow diagram of a method for determining whether a record is dangling according to various embodiments of the present application. According to various embodiments, process 300 is implemented in connection with system 100 of FIG. 1 and/or system 200 of FIG. 2.

According to various embodiments, process 400 is invoked in connection with determining whether a record is a dangling record.

At 405, a service associated with a record is determined.

At 410, a determination is made as to whether the availability of the record is determinable based on a query.

In response to determining that the availability of the record is determinable based on a query at 410, process 400 proceeds to 415 at which a query is sent to query an availability of the record with respect to the service.

At 420, an indication of whether the record is available with respect to the service is received.

At 425, a determination of whether the record is dangling is made based at least in part on an indication of whether the record is available with respect to the service.

In response to determining that the availability of the record is not determinable based on a query at 410, process 400 proceeds to 435 at which a determination is made as to whether availability of the record is determinable based on a registration (or attempt of registration). In response to determining that the availability of record is not determinable based on a registration or attempt of registration at 435, process 400 proceeds to 430.

In response to determining that the availability of record is determinable based on a registration or attempt of registration at 435 (or in response to a determination to attempt registration of the record), process 400 proceeds to 440 at which a registration request is sent to the service (e.g., the record service) that manages registration for record. For example, in the case of a third party service that provides registration with respect to subdomains (e.g., Shopify, Substack.com, Facebook, etc.), system sends a request to register the record. As another example, in the case of a domain and the service being a top-level domain registrar (e.g., GoDaddy.com), the system sends a request to register the domain.

At 445, a response to the registration request. In some embodiments, the response indicates whether registration of the record is available with respect to the service. In some embodiments, the response to the registration request is confirmation of the registration (e.g., the system can register the record on behalf of a customer, which was the previous registrant, etc.).

At 450, a determination of whether the record is a dangling record is made based at least in part on the response to the registration request. In some embodiments, the system determines that the record is dangling in response to receiving an indication that registration of the record is available or if the system successfully registers the record (e.g., on behalf of a customer).

At 430, a determination is made as to whether process 400 is complete. In some embodiments, process 400 is determined to be complete in response to a determination that no further records among a set of records for which the system is to perform a check as to whether such records are dangling records, an administrator indicates that process 400 is to be paused or stopped, etc. In response to a determination that process 400 is complete, process 400 ends. In response to a determination that process 400 is not complete, process 400 returns to 405. In some embodiments, process 400 is invoked at a next scheduled time or after a predetermined time, or in response to an event (e.g., in response to receipt of suspicious DNS traffic, etc.).

Figure 5:
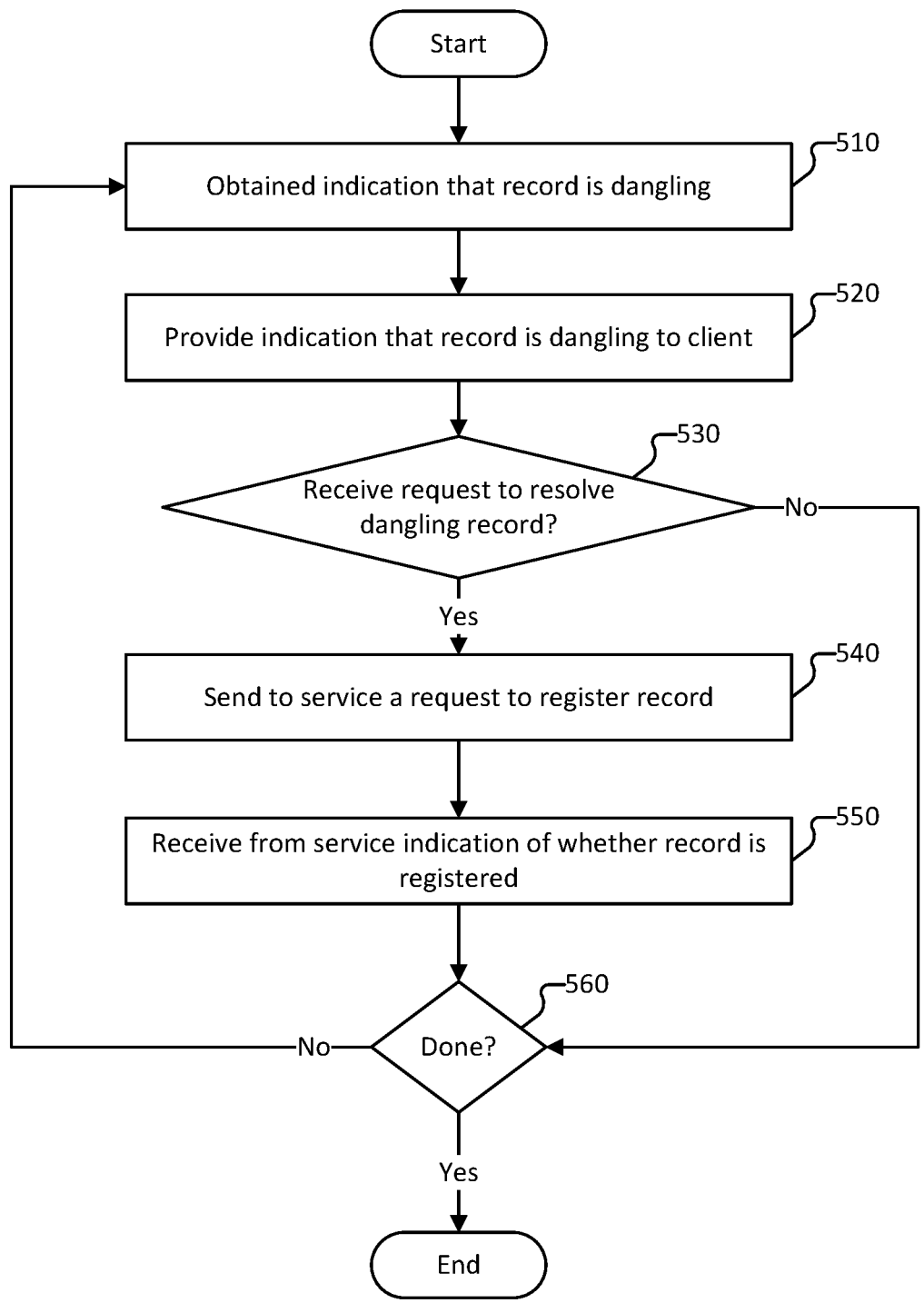
FIG. 5 is a flow diagram of a method for providing an indication that a record is dangling according to various embodiments of the present application.

FIG. 5 is a flow diagram of a method for providing an indication that a record is dangling according to various embodiments of the present application. According to various embodiments, process 300 is implemented in connection with system 100 of FIG. 1 and/or system 200 of FIG. 2.

At 510, an indication that a record is a dangling record is obtained. In some embodiments, the system obtains the indication that the record is a dangling record in response to a determination that registration of the record has expired or lapsed, or in response to a determination that the record is registerable.

At 520, an indication that a record is a dangling record is provided to a client. In response to obtaining an indication that the record is a dangling record (e.g., in response to determining that the record is a dangling record), the system communicates the indication that the record is a dangling record to a client such as a customer (e.g., via a user interface, a dashboard, a text message, email, etc.) or a contact associated with a registration of the record (e.g., a contact comprised in contact information included in a previous registration of the record, such as a WHOIS registrant information).

At 530, a determination is made as to whether a request to resolve the dangling record is received. In some embodiments, the system receives a request to resolve the dangling record such as to register the record on behalf of a user, etc. In some embodiments, the system request to resolve the dangling record is automatically generated based at least in part on a predetermined policy such as a policy for a particular customer of a dangling record service provided by the system.

In response to determining that a request to resolve the dangling record is received at 530, process 500 proceeds to 540 at which a request to register the record is sent to the service.

At 550, an indication of whether the record is registered is received from a service. In response to sending a request to the service (e.g., a third party service that provides/manages registrations for records such as a domain registrar), the system receives a response indicating whether the record is successfully registered.

At 560, a determination is made as to whether process 500 is complete. In some embodiments, process 400 is determined to be complete in response to a determination that no further records are deemed to be dangling records, an administrator indicates that process 500 is to be paused or stopped, etc. In response to a determination that process 500 is complete, process 400 ends. In response to a determination that process 500 is not complete, process 500 returns to 510. In some embodiments, process 500 is invoked at a next scheduled time or after a predetermined time, or in response to an event (e.g., in response to receipt of suspicious DNS traffic, etc.).

Figure 6:
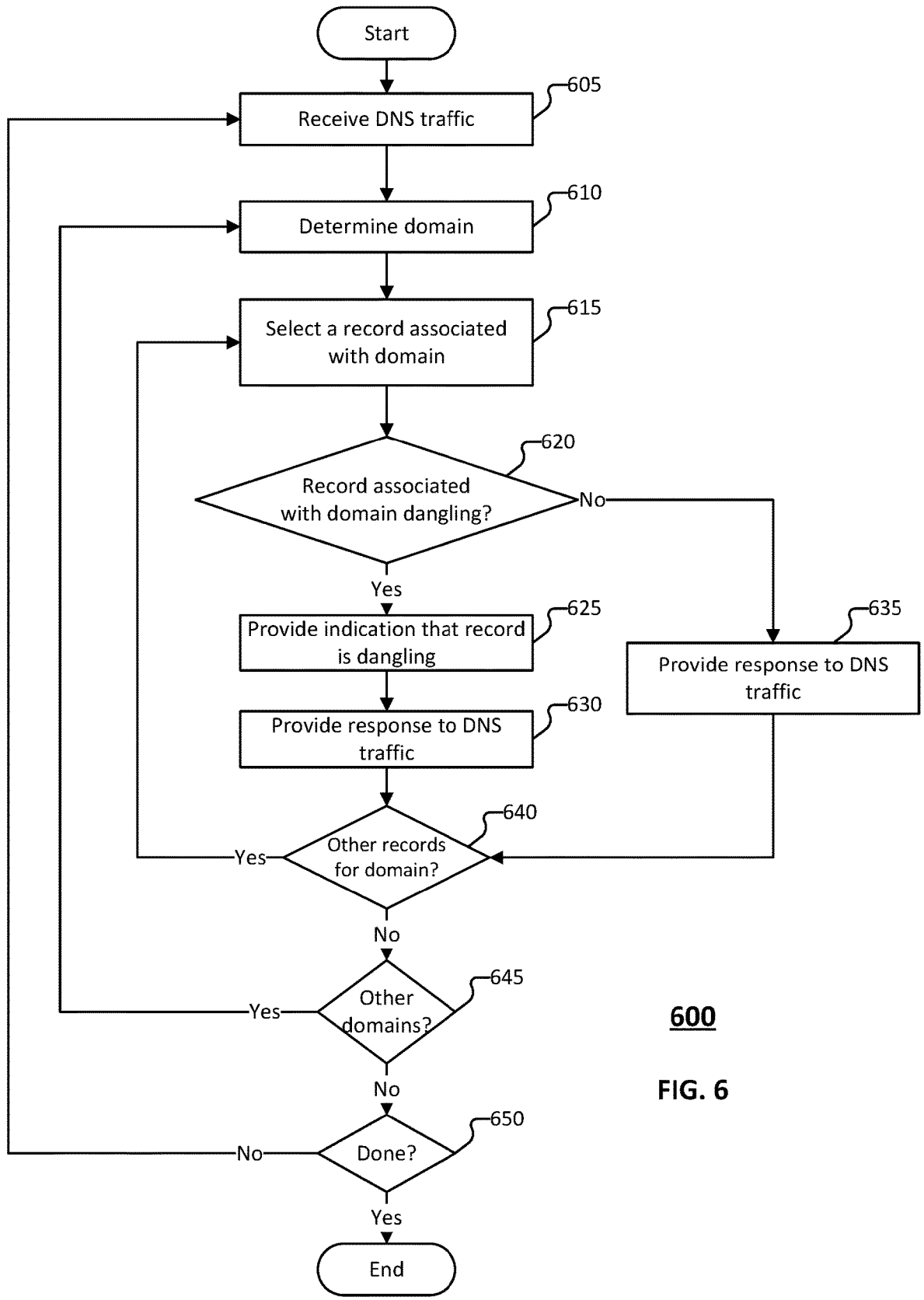
FIG. 6 is a flow diagram of a method for determining whether a record is dangling according to various embodiments of the present application.

FIG. 6 is a flow diagram of a method for determining whether a record is dangling according to various embodiments of the present application. According to various embodiments, process 300 is implemented in connection with system 100 of FIG. 1 and/or system 200 of FIG. 2.

According to various embodiments, process 600 is invoked in response to receiving DNS traffic. For example, process 600 is invoked in response to an intercept invoked with respect to a DNS query or a response to a DNS query.

At 605, DNS traffic is received. In some embodiments, the DNS traffic is received in connection with an intercept that intercepts DNS queries and/or responses to DNS queries.

At 610, a domain is determined. The system determines the domain based at least in part on the DNS traffic. In some embodiments, the system determines the domain comprised in a DNS query or in a response to a DNS query.

At 615, a record associated with the domain is selected. In some embodiments, the system analyzes the DNS traffic and/or the domain from the traffic, and the system determines a record corresponding to the domain. In some embodiments, the system determines a record associated with the domain based at least in part on one or more records mapped to the domain (e.g., one or more records mapped to a user's account with respect to the domain). Examples of a record include a domain, a subdomain, an IP address, an account with a third party service, a mail exchange (MX) record, a nameserver (NS) record, a canonical name (CNAME) record, a delegation name (DNAME) record, etc. In some embodiments, the system selects the record in connection with iterating over all of, or a set of, records associated the domain.

At 620, a determination is made as to whether the record associated with the domain is dangling. In some embodiments, 625 corresponds to, or is similar to, 320 of process 300 of FIG. 3, or 425 or 450 of process 400 of FIG. 4.

In response to determining that the record associated with the domain is dangling at 620, process 600 proceeds to 625 at which an indication that the record is dangling is provided. In some embodiments, 625 corresponds to, or is similar to, 325 of process 300 of FIG. 3. In some embodiments, process 600 does not include 625 (e.g., no notice or indication is provided that the record is a dangling record).

At 630, a response to the DNS traffic is provided. In some embodiments, in response to determining that a record is a dangling record, the system performs an active measure. In the case of DNS traffic, the active measure can include blocking the DNS traffic to the record (e.g., IP address, domain, etc.), or redirecting the DNS traffic to a sinkhole IP.

In response to determining that the record associated with the domain is not dangling at 620, process 600 proceeds to 635 at which a response is provided to DNS traffic. In some embodiments, no action is performed, or no notice is provided, in response to determining that the record is not a dangling record.

At 640, a determination is made as to whether to perform a check or determination for other records associated with the selected domain. In response to determining that the determination is to be made with respect to another record for the selected, process 600 returns to 615 and process 600 continues to perform 615-640 until no further records are to be checked to determine whether such records are dangling records. As an example, the determination of whether further records are to be monitored can be based at least in part on a set of records associated with a customer for such domain. As another example, the determination of whether further records are to be monitored can be based on a user input such as an instruction from an administrator to pause or quit process 600.

In response to determining that the determination is not to be made with respect to another record for the selected domain, process 600 proceeds to 645 at which a determination is made as to whether to perform a check or determination for another domain. In response to determining that the determination is to be made with respect to another domain, process 600 returns to 610 and process 600 continues to perform 610-645 until no further domains are to be monitored to determine whether associated records are dangling records. As an example, the determination of whether further domains are to be checked based on a determination that a set of DNS traffic for which process 600 was invoked does not comprise traffic for any further domains. As another example, the determination of whether further domains are to be checked based on a determination that a set of domains for which the system is to monitor according to a predetermined schedule for which process 600 was invoked does not comprise any further domains. As another example, the determination of whether further domains are to be monitored can be based on a user input such as an instruction from an administrator to pause or quit process 600.

At 650, a determination is made as to whether process 600 is complete. In some embodiments, process 600 is determined to be complete in response to a determination that no further domains exist among the set of domains (e.g., for at least this iteration of process 600), an administrator indicates that process 600 is to be paused or stopped, etc. In response to a determination that process 600 is complete, process 600 ends. In response to a determination that process 600 is not complete, 600 300 returns to 605. In some embodiments, process 600 is invoked at a next intercept with respect to DNS traffic, or in response to an event (e.g., in response to receipt of suspicious DNS traffic, etc.).

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
obtain DNS (domain Name System) traffic based at least in part on an interception of network traffic, the DNS traffic comprising a DNS query directed to a domain;
obtain a set of one or more domains based at least in part on the DNS traffic;
determine whether a record associated with the domain comprised in the set of domains is dangling, wherein:

determining whether the record associated with the domain is dangling comprises:
querying a record registration service for registration information corresponding to the record associated with the domain; and
determining whether the record associated with the domain is dangling based at least in part on the registration information; and
the record associated with the domain is determined to be dangling based at least in part on the registration information in response to a determination that the record is available for registration contemporaneous with receipt of the DNS query directed to the domain; and
in response to determining that the record associated with the domain is dangling, provide, to a registrant, a notification that the record is dangling; and
a memory coupled to the processor and configured to provide the processor with instructions.

2. The system of claim 1, wherein the one or more processors are further configured to block the DNS query to the domain associated with the record that is determined to be dangling.

3. The system of claim 1, wherein the record corresponds to one or more a top-level domain, a sub-domain, and an IP address.

4. The system of claim 1, wherein determining whether the record is dangling comprises:
checking whether a top-level domain associated with the domain is available for registration.

5. The system of claim 3, wherein the checking whether the top-level domain is available for registration comprises:
querying a domain registrar to register the top-level domain.

6. The system of claim 1, wherein determining whether the record is dangling comprises:
checking whether a sub-domain associated with the domain is available for registration.

7. The system of claim 6, wherein the checking whether the sub-domain is available for registration comprises:
querying a service provided by a registrant of a top-level domain associated with the domain, wherein the service is queried to attempt to register the sub-domain.

8. The system of claim 1, wherein determining whether the record is dangling comprises:
attempting to allocate, from a public cloud, an IP address associated with the domain.

9. The system of claim 1, wherein:
the one or more processors are further configured to receive the DNS query; and
the determining whether the record is dangling is performed in response to receipt of the DNS query.

10. The system of claim 9, wherein the domain for which a determination whether an associated record is dangling is performed is selected based at least in part on the DNS query.

11. The system of claim 10, wherein the domain is selected based at least in part on a determination that the DNS query is directed to the domain.

12. The system of claim 9, wherein the determination of whether the record is dangling is performed contemporaneous with resolving the DNS query.

13. The system of claim 1, wherein determining whether the record is dangling is performed at a predetermined time interval.

14. The system of claim 1, wherein the one or more processors are configured to iteratively (i) select a particular domain from the set of domains, and (ii) determine whether a particular record associated with the particular domain is dangling.

15. The system of claim 1, wherein providing the notification to the registrant comprises:
   determining a particular registrant associated with the record; and
   send a communication to the particular registrant.

16. The system of claim 15, wherein the communication is an email.

17. The system of claim 1, wherein the one or more processors are further configured to:
   receive traffic to the domain associated with a dangling record; and
   route the traffic according to a customer security policy for a customer associated with the domain.

18. A method, comprising:
   obtaining DNS (domain Name System) traffic based at least in part on an interception of network traffic, the DNS traffic comprising a DNS query directed to a domain;
   obtaining, by one or more processors, a set of one or more domains based at least in part on the DNS traffic;
   determining, by the one or more processors, whether a record associated with the domain comprised in the set of domains is dangling, wherein:
      determining whether the record associated with the domain is dangling comprises:
         querying a record registration service for registration information corresponding to the record associated with the domain; and
         determining whether the record associated with the domain is dangling based at least in part on the registration information; and
      the record associated with the domain is determined to be dangling based at least in part on the registration information in response to a determination that the record is available for registration contemporaneous with receipt of the DNS query directed to the domain; and
   in response to determining that the record associated with the domain is dangling, providing, to a registrant, a notification that the record is dangling.

19. A computer program product embodied in a non-transitory computer readable medium and comprising computer instructions for:
   obtaining DNS (domain Name System) traffic based at least in part on an interception of network traffic, the DNS traffic comprising a DNS query directed to a domain;
   obtaining, by one or more processors, a set of one or more domains based at least in part on the DNS traffic;
   determining, by the one or more processors, whether a record associated with the domain comprised in the set of domains is dangling, wherein:
      determining whether the record associated with the domain is dangling comprises:
         querying a record registration service for registration information corresponding to the record associated with the domain; and
         determining whether the record associated with the domain is dangling based at least in part on the registration information; and
      the record associated with the domain is determined to be dangling based at least in part on the registration information in response to a determination that the record is available for registration contemporaneous with receipt of a DNS query the DNS query directed to the domain; and
   in response to determining that the record associated with the domain is dangling, providing, to a registrant, a notification that the record is dangling.

\* \* \* \* \*